United States Patent Office 2,829,703
Patented Apr. 8, 1958

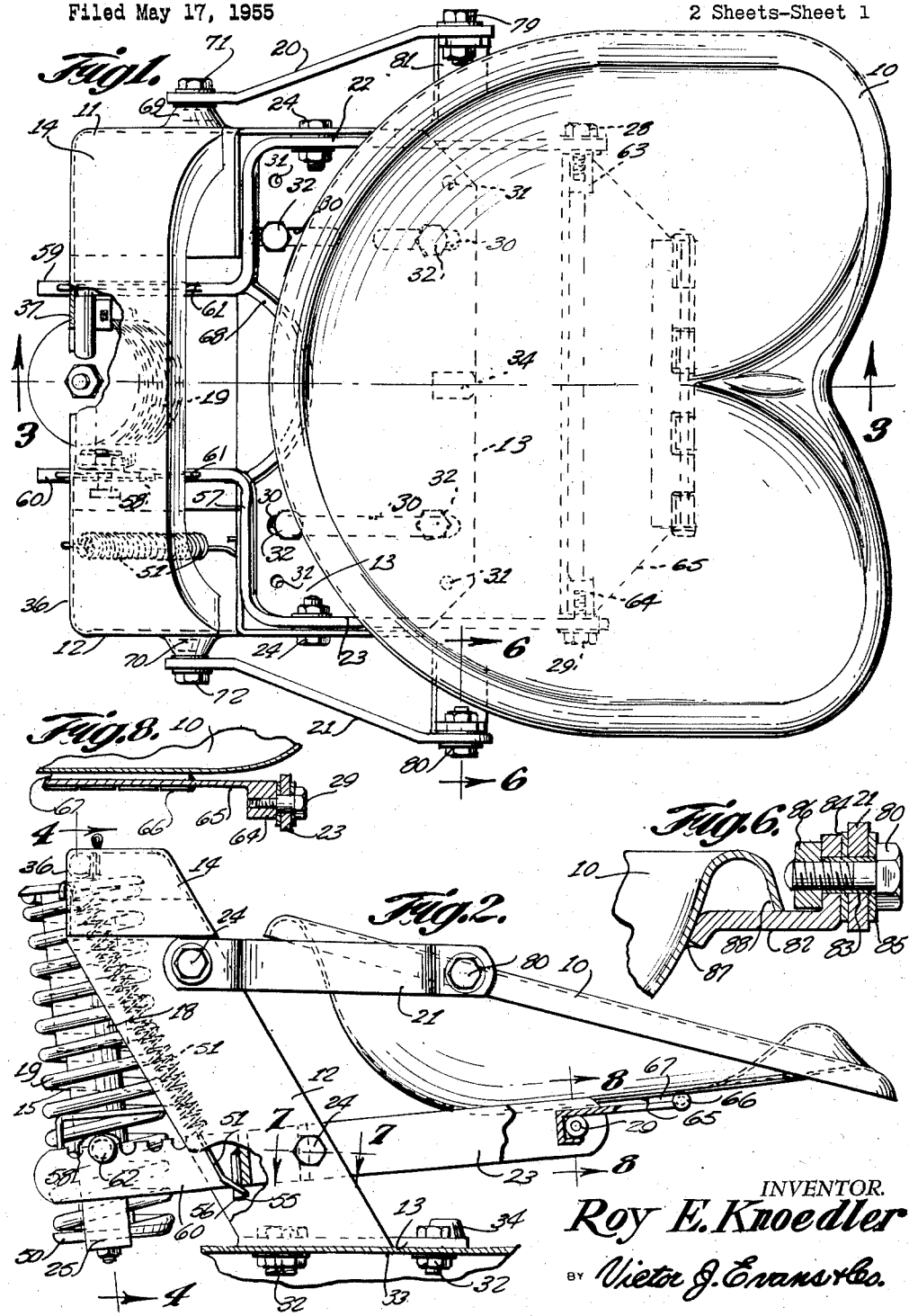
April 8, 1958 — R. E. KNOEDLER — 2,829,703
RESILIENT TIP-UP TRACTOR SEAT
Filed May 17, 1955 — 2 Sheets-Sheet 1
INVENTOR.
Roy E. Knoedler
BY Victor J. Evans & Co.
ATTORNEYS April 8, 1958  R. E. KNOEDLER  2,829,703
RESILIENT TIP-UP TRACTOR SEAT
Filed May 17, 1955  2 Sheets-Sheet 2
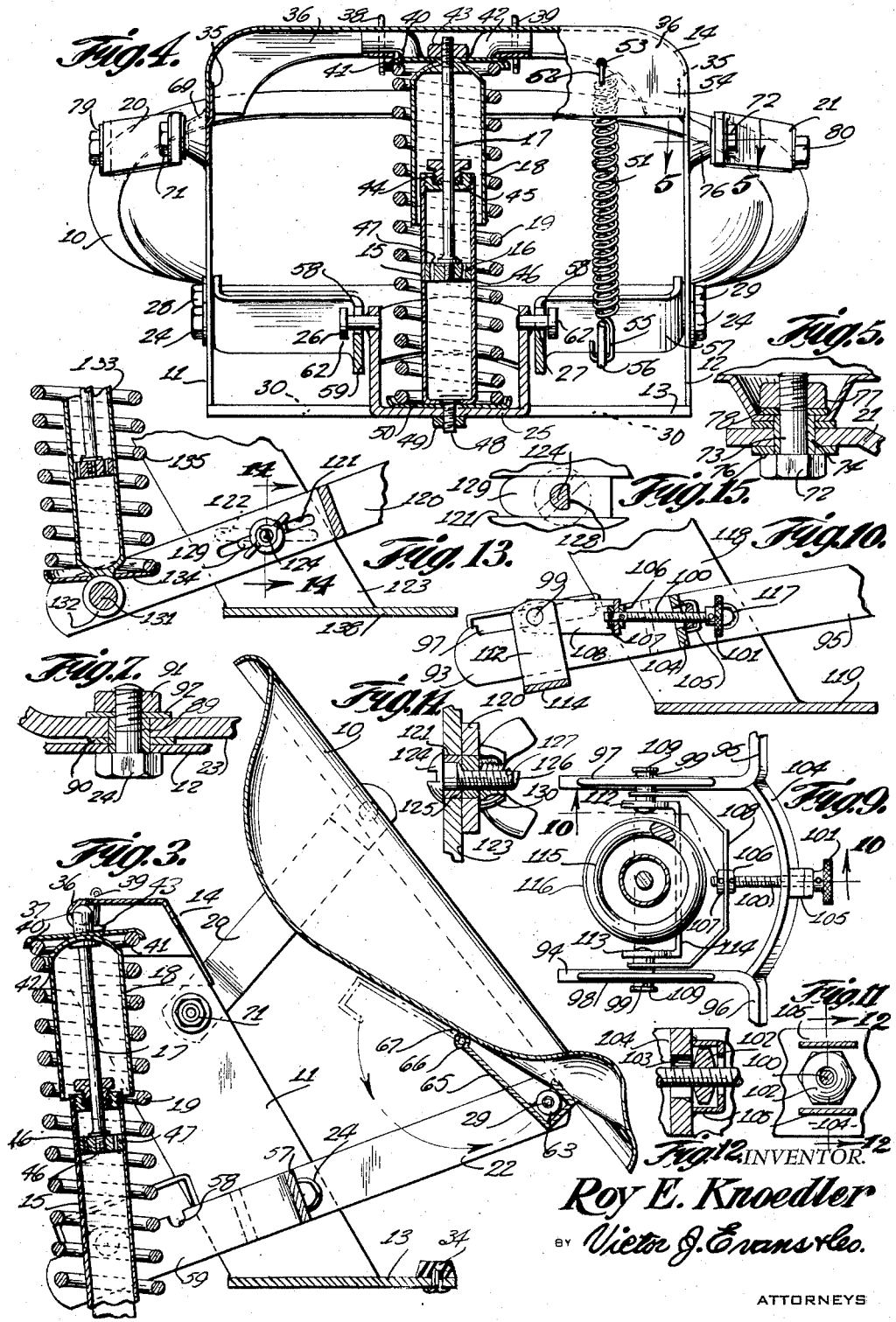
INVENTOR.
Roy E. Knoedler
BY Victor J. Evans & Co.
ATTORNEYS

2,829,703

RESILIENT TIP-UP TRACTOR SEAT

Roy E. Knoedler, Streator, Ill.

Application May 17, 1955, Serial No. 508,951

8 Claims. (Cl. 155—51)

This invention relates to resilient seats particularly adapted for the seat on a tractor or the like, and is particular a tractor seat wherein the seat is resiliently supported by a pair of fulcrumed levers wherein means is provided for quickly and easily adjusting the relationship of the fulcrum to a supporting spring member to allow the seat to support operators of various weights, and wherein means is provided to quickly move the seat to a rearward vertically disposed position out of the way of the operator when he wishes to stand, or to get on or off of the tractor. With the seat tipped vertically and rearwardly standing room is provided in front of the seat, and rain and snow and the like readily drain therefrom.

The purpose of this invention is to provide a resilient tractor seat in which a vertically disposed seat is readily moved downwardly and forwardly by pulling on the forward edge to a horizontally disposed position for use and wherein means is provided for permitting the seat to be returned to the upwardly disposed position when the rear edge of the seat is pulled upwardly, whereby the seat is in an out-of-the-way position when not in use, and wherein a substantially floating seat is provided for the operator of a tractor.

The resilient seat of this application is an improvement over the seat support of my former Patent No. 2,531,572 in that means is provided for tipping the seat from a horizontally disposed position to a substantially vertical rearwardly disposed position as an upward force is applied to the rear of the seat with the weight of an operator removed from the seat, and this seat is also an improvement over that of the patent of Frederick E. Knoedler No. 2,432,554 in that the spring and hydraulic cylinder are positioned at the rear of the seat and the mounting elements are adapted to permit the seat to be tipped upwardly and rearwardly to a substantially vertical position as desired when the operator wishes to stand, to mount or dismount from the tractor.

Resilient operator seats for farm and industrial machines are becoming very popular due to the fact that the ground wheels of such machines are rigidly mounted to the machines, and operating speeds are being constantly increased. As a result, operators of such machines are subjected to unusual physical punishment unless resilient seats are provided. Such seats must provide a controlled ride similar to the wheel suspensions on modern automobiles with the weight of the operator supported on a soft spring member and with the rebound of the spring controlled by the valving of a hydraulic shock absorber cylinder. Since the weights of various operators will vary by as much as 300 percent, such seats must be fully adjustable so as to provide a soft controlled ride for operators of all weights.

A new trend in the design of farm tractors and industrial power equipment provides only minimum space for a resilient seat suspension mechanism. In many examples the operator sits or stands astride the main machine frame in such a manner that provision must be made to provide both a substantially horizontal position for the the seat when the operator is seated, and to quickly and easily provide a substantially vertical and rearwardly disposed position for the seat when the operator wishes to stand.

With this thought in mind, this invention contemplates instrumentalities for obtaining a tip-up, rearward movement of a resiliently supported seat from a substantially horizontal position to a substantially vertical rearwardly disposed position as an upward pull is applied to the rear edge of the seat after the weight of an operator is removed therefrom.

The object of this invention is, therefore, to provide an improved resilient seat mechanism in which means is provided for permitting a seat to be tipped upwardly to a substantially vertical and rearward position upon removal of weight from the seat and upon the application of an upward force to the rear edge of the seat.

Another object of the invention is to provide means for collapsing a seat to provide additional standing room as weight is removed from the seat.

A further object of the invention is to provide a tip-up seat that is adapted to be used on conventional tractors and industrial machines now in use.

A still further object of the invention is to provide a resilient tip-up seat in which the mechanism is of a simple and economical construction.

With these and other objects and advantages in view, the invention embodies a substantially inverted U-shaped frame having a hydraulic cylinder with a spring thereon pivotally mounted in the upper end, a pair of lower levers pivotally mounted in the sides of the inverted U-shaped frame and positioned with notches or retaining slots in the rear ends thereof positioned to receive pins of a yoke on the lower end of the hydraulic cylinder and spring assembly at the rear of the frame and with ends extended from the forward side of the frame pivotally connected to the forward portion of a seat, the rear portion of which is pivotally connected by links with opposite ends of said links pivotally connected to the sides of the inverted U-shaped frame, and an auxiliary spring connected to one of the lower levers and also to the upper end of the inverted U-shaped frame for maintaining tension in the levers to retain the pins of the yoke in the notches of the levers after the spring of the cylinder is fully extended, such as when the weight of the operator is removed from the seat, and also so as not to accidentally disengage the pins of the yoke from the notches of the levers when upward pull is applied to the rear edge of the seat when the seat is shifted to its substantially vertical position.

Other features and advantages of the invention will appear from the following description, taken in connection with the accompanying drawings, wherein:

Figure 1 is a plan view of the improved resilient seat, showing the seat in a horizontally disposed position.

Figure 2 is a side elevational view of the improved tip-up resilient seat with parts broken away showing a connection at the lower end of an auxiliary spring to one of the seat supporting levers, with the upper end of the spring connected to the inverted U-shaped frame.

Figure 3 is a longitudinal section through the seat assembly taken on line 3—3 of Figure 1 showing the seat in the vertically and rearwardly disposed position.

Figure 4 is a rear elevational view looking toward the back of the seat support with parts broken away, on line 4—4 of Figure 2, illustrating the mounting of the hydraulic cylinder and spring in an inverted U-shaped frame.

Figure 5 is a section taken on line 5—5 of Figure 4 showing one of the pivotal connections of the links to the frame.

Figure 6 is a section taken on line 6—6 of Figure 1 showing one of the pivotal connections of the links to the seat.

Figure 7 is a section taken on line 7—7 of Figure 2 showing the pivotal mounting of one of the lower levers on the side of the inverted U-shaped frame.

Figure 8 is a section taken on line 8—8 of Figure 2 showing the pivotal connections of the forward ends of the levers with a link plate, with said plate also being hinge connected to the under surface of the seat.

Figure 9 is a plan view illustrating a modification wherein instead of using notches in the upper edges of the rearwardly extended levers for adjusting leverage change to accommodate operators of various weights, pins of a yoke on the lower end of the cylinder and spring are positioned in retaining slots in the upper edges of the levers, in which the positions of the parts are adjusted by a thumb screw.

Figure 10 is a longitudinal section taken on line 10—10 of Figure 9 also showing the connection of the thumb screw to the lower end of the hydraulic cylinder and spring.

Figure 11 is a cross section through a cage for retaining a nut on the thumb screw of the design shown in Figures 9 and 10, the parts being shown on an enlarged scale.

Figure 12 is a longitudinal section taken on line 12—12 of Figure 11, also with the parts shown on an enlarged scale and also showing the cage for retaining the nut on the thumb screw in position on the screw.

Figure 13 is a longitudinal section through the lower portion of the seat mounting illustrating a modification wherein the distance from the connection of the spring and hydraulic cylinder assembly to the levers and the fulcrum of the levers is adjustable.

Figure 14 is a cross section through the fulcrum of the design shown in Figure 13 being taken on line 14—14 of Figure 13.

Figure 15 is a view showing a slider positioned in the slots of the levers in the design shown in Figure 13.

Referring now to the drawings, wherein like reference characters denote corresponding parts, the improved tip-up resilient seat of this invention includes a seat 10, and inverted U-shaped frame having arms or uprights 11 and 12 mounted on a base 13 and positioned with the upper ends thereof connected by a cap 14, a hydraulic cylinder 15 having a piston 16 therein and a piston rod 17 extended therefrom, a sleeve 18 providing a dust shield positioned above the upper end of the cylinder, a spring 19 positioned around the cylinder and sleeve, links 20 and 21 pivotally connecting the seat to the arms of the frame, and levers or arms 22 and 23 pivotally mounted, with cap screws 24 providing fulcrums in the arms 11 and 12 of the frame, and positioned with rear ends pivotally connected to a yoke 25 on the lower end of the cylinder and spring assembly with pins 26 and 27 and with the forward ends pivotally connected to a double-jointed hinge on the seat with cap screws 28 and 29.

The base 13 of the inverted U-shaped frame of the seat is provided with various patterns of slots 30 and bolt holes 31 through which bolts 32 extend which secure the base to the upper surface of a housing 33, in various combinations and positions to best accommodate a particular machine or tractor. The forward edge may be provided with bumpers of resilient material, as indicated by the numeral 34. The arms 11 and 12 extend upwardly from the sides of the base and offset portions 35 on the upper ends of the arms extend into the cap 14 to which the offset ends are secured, such as by welding or the like. The rear portion of the cap 14 is provided with arcuate flanges 36 in which rods 37 and 38 on the upper end of the piston rod 17 are nested and, as shown in Figures 3 and 4, the rods are retained in tabs of the cap of the frame with fasteners, such as cotter pins 39.

The upper end of the spring 19 is held with a rocker cap 40 in which the upper end of the rod 17 is held by a nut 43, rocker cap 40 having an arcuate peripheral flange 41 in which the upper coil of the spring is positioned and the upper end of the rod 17, which extends through an opening 42 in the rocker cap 40 is adjustably held by a nut 43. The piston rod also extends through a packing gland 44, a lower section 45 of which is threaded in the upper end of the cylinder 15, and a threaded stud 46 on the lower end of the of the piston rod is threaded into the piston 16. The piston is provided with bleeder openings 47 that are designed to restrict the flow of fluid through the piston to provide a cushioning action restricting upward movement of the piston in the cylinder, but more particularly to provide a restrictive control of the rebound of the coil spring surrounding the cylinder as the spring releases its stored-up energy after being compressed, such as when the tractor or machine strikes a bump. The lower end of the cylinder is secured by a stud 48 having a nut 49 thereon in the lower part of the yoke 25 and a washer 50 also having an arcuate peripheral flange and positioned in the yoke provides a seat for the lower end of the spring 19. An auxiliary spring 51 positioned with a hook 52 on the upper end in an opening 53 in a rear wall 54 of the cap 14 and with a hook 55 on the lower end secured by a pin 56 to a section 57 of the lower lever 23 maintains tension on the lower levers 22 and 23 so that the pins 26 and 27 are retained in notches 58 in upper edges of the levers when the spring of the cylinder is fully extended, while the machine is traveling over rough terrain, and so as not to accidentally disengage the pins of the yoke in the notches of the levers when upward pull is applied to the rear edge of the seat when the seat is shifted to its substantially vertical and rearward position.

The lower levers 22 and 23 are formed with inwardly extended sections, such as the section 57 of the lever 23 and the notches 58 that are positioned to receive the pins 26 and 27, are positioned in upper edges of rear ends 59 and 60 which extend from inner ends of the sections, such as the section 57. The ends 59 and 60 are provided with U-shaped guards 61 that extend upwardly above the pins 26 and 27 to prevent the pins being accidentally displaced from the notches in the upper edges of the ends of the levers. The pins 26 and 27 which are provided with heads 62, are secured such as by welding, in the upwardly extended arms of the yoke 25, as shown in Figure 4.

The forward ends of the lower levers 22 and 23 are pivotally secured by the cap screws 28 and 29 to nuts 63 and 64, said nuts being secured such as by welding to a link plate 65 extended from a hinge 66, the opposite plate 67 of which is secured, such as by welding, to the under surface of the seat 10, as shown in Figures 2 and 3.

The inwardly extended sections 59 and 60 of the lower levers 22 and 23 are connected with an arcuate bar 68, as shown in Figure 1.

The upper links 20 and 21 are secured to bosses 69 and 70 on the sides of the arms 11 and 12 of the inverted U-shaped support with bolts 71 and 72, as illustrated in Figure 5, in which the bolt 72 is positioned as shown in detail with a bearing assembly pressed into machined holes in the forward ends of levers 22 and 23, and in machined holes in both ends of links 20 and 21. Thus pivotal connections are provided at each of these points. Nuts 77 are provided on inner ends of the bolts. The brackets 81 and 82 are secured to sides of the seat such as by welding, as shown at the points 87 and 88.

The bolts 24 connecting the lower levers 22 and 23 to the arms 11 and 12 are also provided with bearings as indicated by the numeral 89, providing swivel connections. The bearings are secured by the bolts 24 and nuts 91, as shown in Figure 7.

In the design illustrated in Figures 9 and 10, inner ends 93 and 94 of lower levers 95 and 96 are provided with recess slots 97 and 98 instead of the notches 58 and pins 99, similar to the pins 26 and 27, are adapted to slide forwardly and rearwardly in the recess slots with the pins actuated by a thumb screw 100 having a knurled head 101, threaded into a collar or nut 102 and extended through an opening 103 in a bar 104 connecting the ends 93 and 94 of the lower levers. The nut 102 is retained in a cage 105 on the bar 104 and the inner end of the screw is held by set collars 106 and 107 in a yoke 108 in the ends of which the pins 99 similar to the pins 26 and 27 are positioned.

With the design illustrated in Figures 9 and 10, auxiliary spring 51 and guards such as the guards 61 are not required, since accidental displacement of pins 99 from the recesses 97 and 98 would not be possible.

The pins 99, which are provided with heads 109, are secured in arms 112 and 113 of a yoke 114, similar to the yoke 25, and on which a washer 115 which provides a seat for a spring 116, similar to the spring 19, is secured.

With the levers 95 and 96 pivotally mounted by bolts 117 in arms 118 of an inverted U-shaped frame 119, the lower end of the spring and cylinder assembly is readily adjusted by the head 101 of the thumb screw 100 to compensate for operators of different weights riding on the seat.

As illustrated in Figures 13, 14 and 15, levers 120 similar to the levers 22 and 23 may be provided with slots 121, and with similar slots 122 in arms 123, similar to the arms 11 and 12 of the supporting frame, the bolt 124, which provides the fulcrum is adapted to be adjusted in relation to the connection formed by the lower end of the spring and hydraulic cylinder assembly and levers to compensate for operators of different weights.

The bolts 124 are pivotally mounted in bushings 125 in the arms 123 and threaded shanks 126 of the bolts are provided with flat sides 127 that coact with flat surfaces 128 of keys 129 in the slots 121 of the levers. By this means the levers are adapted to slide on the fulcrum bolts and the bolts are adapted to slide in the slots 122 of the arms 123. The threaded shanks of the bolts 124, are provided with wing nuts 130 with which the fulcrums may be tightened or released to make adjustments therein, and the extended ends of the levers are connected with a bolt 131 to an eye 132 on the lower end of the hydraulic cylinder which is indicated by the numeral 133. A washer 134 on the lower end of the cylinder 133 provides a seat for the lower end of a spring 135, similar to the spring 19. The arms 123 extend upwardly from a base plate 136, similar to the plate 13, shown in Figure 3.

In both designs the forward edge of the seat is swingably connected to the levers with a double jointed hinge whereby the forward edge of the seat is adapted to swing upwardly and inwardly in relation to the ends of the levers so that the maximum amount of standing space is provided in front of the seat with the seat folded upwardly, and mounting and dismounting of an operator on and off of the tractor is facilitated.

With the parts designed and assembled as illustrated and described, the seat is mounted on a tractor with fastening elements, such as the bolts 32 which may extend through the bolt holes 31 or slots 30, and for use the seat is drawn downwardly to the position shown in Figures 1 and 2 by pulling forward on the forward end of the seat, whereby the seat portion is moved to a substantially horizontal position. With the weight of the operater removed from the seat, an upward pull on the back of the seat starts the seat upwardly and rearwardly to the position shown in Figure 3 to provide additional space in front of the seat for leg room when the operator stands, mounts or dismounts the machine, and, at the same time, snow, rain, and the like readily drain from the seat.

By adjusting the positions of the pins 26 and 27 in the notches 58 in the upper edges of the ends 59 and 60, the leverage advantage is changed to provide deflection from the spring and cylinder assembly to balance the weights of various machine operators as positioned on the seat. The position of the cylinder and spring assembly is also adjustable by turning the thumb screw 100 as hereinbefore described.

By this means an adjustable tractor seat is provided wherein the seat 10 is resiliently supported on the levers 22 and 23 which are fulcrumed in the side arms 11 and 12 of the frame with the seat mounted on the levers with a link plate 65 positioned with one edge hinged to the under surface of the seat and with the other pivotally connected to the levers with the cap screws 28 and 29, the upper part of the seat being pivotally connected by the links 20 and 21 to the upper part of the frame, and the seat being cushioned by the compression spring and hydraulic cylinder assembly positioned between the ends of the levers extended beyond the fulcrums and the upper end of the frame, the notches 58 in the levers and pins 26 and 27 of the yoke 25 at the lower end of the spring and hydraulic cylinder assembly and the sliding mounting of the bolts 25 providing means for adjusting the relationship between the fulcrum and connection of the spring and hydraulic cylinder assembly to compensate for operators of different weights using the seat, the said mounting providing means whereby the seat is adapted to be tilted upwardly to an out-of-the-way position to provide space for standing and to facilitate mounting the tractor and also dismounting from the tractor when the seat is not in use.

It will be understood that other modifications, within the scope of the appended claims, may be made in the design and arrangement of the parts without departing from the spirit of the invention.

What is claimed is:

1. In a resiliently supported seat, the combination which comprises a frame having spaced vertically disposed upwardly and rearwardly inclined side arms extended from a base and having upper ends thereof connected with a cap, the seat being positioned on the forward side of the frame, substantially horizontally disposed lower levers pivotally mounted on the arms of the frame and extended forwardly and rearwardly therefrom, a link plate pivotally connecting forward ends of said lower levers, means hinging the link plate to the seat, a combination hydraulic cylinder and spring assembly extended between ends of the levers extended rearwardly from the frame and the cap of the frame, links pivotally connected at one of the ends thereof to the side arms of the frame and at the opposite ends to the rear portion of the seat whereby upon removing the weight of an operator on the seat, an upward pull on the rear edge of the seat will cause the seat to move to a rearwardly and substantially vertically and upwardly inclined position.

2. In a resiliently supported seat, the combination which comprises an inverted U-shaped frame having spaced vertically disposed upwardly and rearwardly inclined side arms extended from a base and having upper ends thereof connected with a cap, the seat being positioned on the forward side of the frame, substantially horizontally disposed lower levers fulcrumed on the arms of the frame and extended forwardly and rearwardly therefrom, a link plate pivotally connecting forward ends of said lower levers, means hinging the link plate to the seat, a combination hydraulic cylinder and spring assembly extended between ends of the lever extended rearwardly from the arms of the frame and the cap of the frame, links pivotally connected at one of the ends thereof to the side arms of the frame and at the opposite ends to the rear portion of the seat, whereby upon removing the weight of an operator on the seat an upward pull on the rear edge of the seat will cause the seat to move upwardly to a rearwardly and substantially vertically inclined position, and means for variable adjusting the position of the lower end of the hydraulic cylinder and spring assembly in relation to said lower levers.

3. In a resiliently supported seat, the combination which comprises an inverted U-shaped frame having spaced vertically disposed upwardly and rearwardly inclined side arms extended from a base and having upper ends thereof connected with a cap, a seat positioned on the forward side of the frame, substantially horizontally disposed lower levers fulcrumed on the arms of the frame and extended forwardly and rearwardly therefrom, a link plate pivotally connecting forward ends of said lower levers, means hinging the link plate to the seat, a combination hydraulic cylinder and spring assembly extended between ends of the levers extended rearwardly from the arms of the frame and the cap of the frame, links pivotally connected at one of the ends thereof to the side arms of the frame and at the opposite ends to the rear portion of the seat, whereby upon removing the weight of an operator on the seat an upward pull on the rear edge of the seat will cause the seat to move upwardly to a rearwardly and substantially vertically inclined position, and means for variably adjusting the position of the lower end of the hydraulic cylinder and spring assembly in relation to the fulcrum of the lower levers, and an auxiliary tension spring positioned with the upper end connected to said cap of the frame and the lower end connected to one of said lower levers at a point rearwardly from the pivotal mounting of the lever to the arm of the frame.

4. In a resiliently supported tractor seat, the combination which comprises an inverted U-shaped frame having spaced upwardly and rearwardly disposed side arms, a pair of levers extended through the frame and having forwardly extended ends for carrying the seat, means for pivotally mounting the levers on the side arms of the frame, said pivotal mounting means providing fulcrums for the levers, a double jointed hinge connecting the forward part of the seat to the ends of the levers extended from the forward side of the frame, cushioning means between the ends of the levers extended from the rear of the frame and the upper end of the frame, and means for adjusting the distance between the fulcruming means of the levers and a connection between the cushioning means and levers.

5. In a resiliently supported tractor seat, the combination which comprises an inverted U-shaped frame having spaced upwardly and rearwardly disposed side arms, a pair of levers extended through the frame and having forwardly extended ends for carrying the seat, means for pivotally mounting the levers on the side arms of the frame, said pivotal mounting means providing fulcrums for the levers, a double jointed hinge connecting the forward part of the seat to the ends of the levers extended from the forward side of the frame, links pivotally connected at one of the ends thereof to sides of the seat and at the opposite ends to the upper part of the frame, cushioning means between the ends of the levers extended from the rear of the frame and the upper end of the frame, and means for adjusting the distance between the fulcruming means of the levers and a connection between the cushioning means and levers.

6. In a resiliently supported seat, the combination which comprises a supporting frame having a base with spaced upwardly and rearwardly disposed uprights, a pair of arms pivotally mounted on the uprights of the frame and extended forwardly therefrom for carrying the seat, links having one of the ends thereof pivotally connected to upper parts of the uprights and with the opposite ends pivotally connected to the rear portion of the seat, a link plate pivotally connecting the forward portion of the seat to forward ends of said arms whereby upon upward movement of the forward ends of the arms and links the seat tilts upwardly to an inclined position, and resilient means between the arms and upper part of the supporting frame for cushioning the seat, the assembly of levers and arms permitting the seat to be actuated to an upwardly disposed position upon the removal of the weight of an operator therefrom.

7. In a resiliently supported seat, the combination which comprises a supporting frame having a base with spaced upwardly and rearwardly disposed uprights, a pair of arms pivotally mounted on the uprights of the frame and extended forwardly therefrom for carrying the seat, links having one of the ends thereof pivotally connected to upper parts of the uprights and with the opposite ends pivotally connected to the rear portion of the seat, a link plate pivotally connecting the forward portion of the seat to forward ends of said arms whereby upon upward movement of the forward ends of the arms and links the seat tilts upwardly to an inclined position, resilient means between the arms and upper part of the supporting frame for cushioning the seat, the assembly of levers and arms permitting the seat to be actuated to an upwardly disposed position upon the removal of the weight of an operator therefrom, and means for adjusting the tension of said resilient means.

8. In a resiliently supported seat, the combination which comprises a supporting frame having spaced uprights, a pair of arms pivotally mounted on the uprights of the frame and extended forwardly therefrom for carrying the seat, links having one of the ends thereof pivotally connected to upper parts of the uprights and with the opposite ends pivotally connected to the rear portion of the seat, pivotal connecting means mounting the forward portion of the seat on forward ends of said arms whereby upon upward movement of the forward ends of the arms and links the seat tilts upwardly to an inclined position, resilient means positioned between the arms and frame for cushioning the seat, said seat being mounted to be actuated to an upwardly disposed position upon the removal of the weight of an operator therefrom, and means for adjusting the tension of said resilient means.

References Cited in the file of this patent

UNITED STATES PATENTS

| 458,136 | Wilder | Aug. 18, 1891 |
|---|---|---|
| 1,508,107 | Lillesoe | Sept. 9, 1924 |
| 2,512,219 | Adkins | June 20, 1950 |
| 2,531,572 | Knoedler | Nov. 28, 1950 |
| 2,598,384 | Huber | May 27, 1952 |
| 2,641,308 | Bock | June 9, 1953 |